Nov. 11, 1930.    E. S. MacPHERSON    1,781,406
AXLE MOUNTING
Filed July 30, 1928

Inventor
Earle S. MacPherson

By Whitemore Hulbert Whittemore & Belknap
Attorneys

Patented Nov. 11, 1930

1,781,406

UNITED STATES PATENT OFFICE

EARLE S. MacPHERSON, OF DETROIT, MICHIGAN, ASSIGNOR TO HUPP MOTOR CAR COMPANY, OF DETROIT, MICHIGAN, A CORPORATION OF VIRGINIA

AXLE MOUNTING

Application filed July 30, 1928. Serial No. 296,283.

The invention relates generally to chassis constructions and more particularly to a means for mounting a member upon the chassis.

One of the primary objects of the present invention is to provide a non-metallic mounting for the rear axle of a motor vehicle capable of absorbing squeaks and other noises developed by certain parts of the chassis and thereby prevent the same from being transmitted to the body of the vehicle.

Another object of this invention is to provide a mounting of the above character having a resilient pad interposed between the axle support and axle so that substantially the entire load of the vehicle rests upon the resilient pad.

A further object of this invention is to provide a mounting of the above type which in addition to insulating the axle from metallic contact with its support, also functions to insulate the axle securing bolts from contact with the axle bracket and to place these bolts under tension so as to prevent the same from working loose.

Other objects and novel details of construction of this invention will be made more apparent as this description proceeds, especially when considered in connection with the accompanying drawings wherein.

Figure 1:
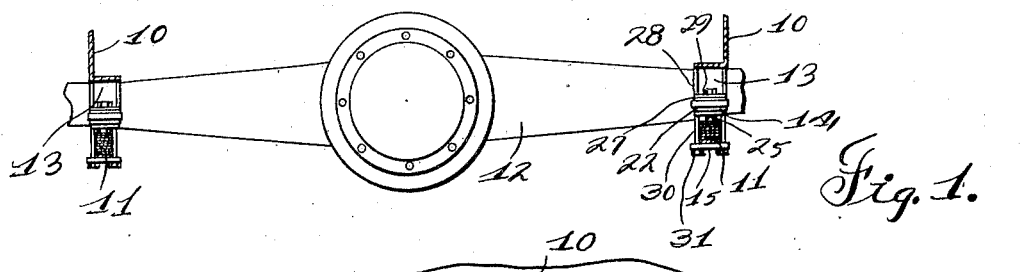
Figure 1 is a fragmentary sectional view of a vehicle frame having an axle mounted thereon in accordance with my invention.
Figure 2:
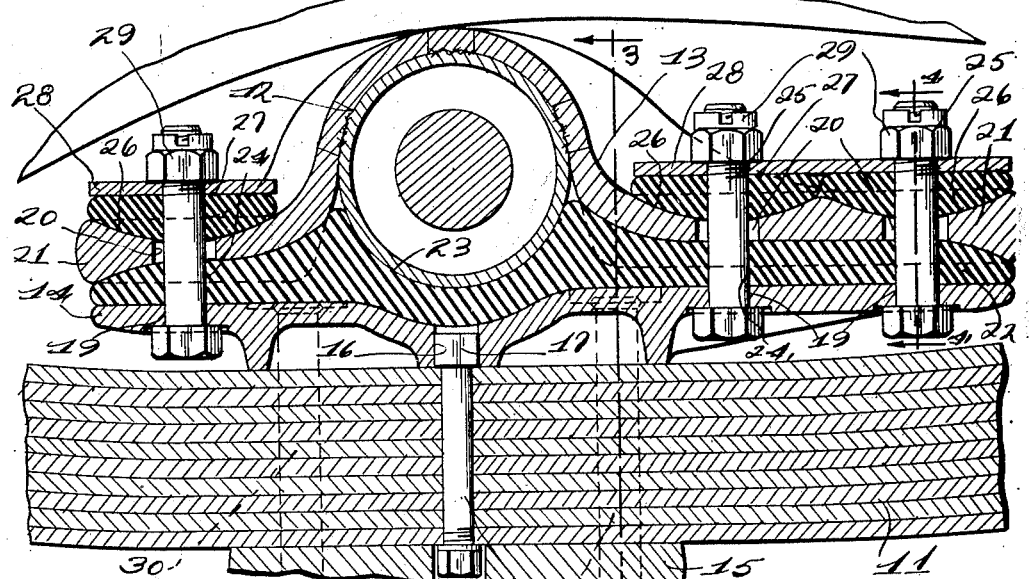
Figure 2 is a longitudinal sectional view through the axle and mounting therefor.
Figure 3:
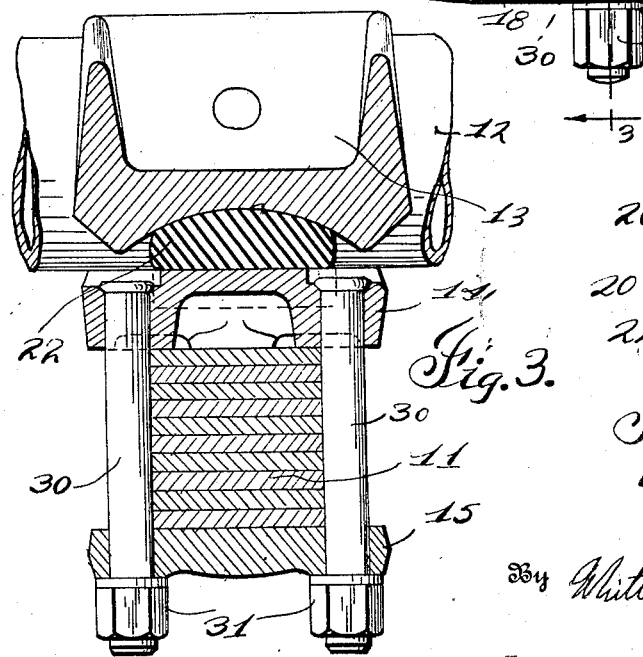
Figure 3 is a sectional view taken on the line 3—3 of Figure 2.
Figure 4:
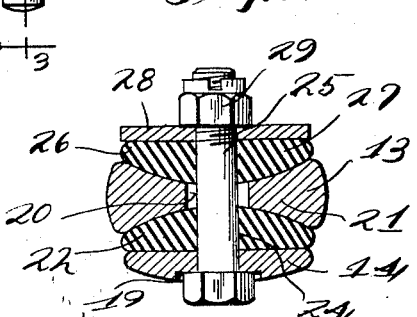
Figure 4 is a sectional view taken on the line 4—4 of Figure 2.

Referring now to the drawings, it will be noted that there is illustrated fragmentarily a vehicle frame 10 having the usual leaf springs 11 secured thereto in the customary manner. Carried by the springs 11 is a conventional rear axle housing 12 having brackets 13 secured adjacent the ends thereof. The brackets 13 may be secured to the housing 12 in any suitable manner herein, for the purpose of illustration only, shown as keywelded to the housing. Inasmuch as both brackets and the means for securing the same to the springs are identical, only one will be described in detail herein.

For mounting the bracket 13 upon the spring 11 I provide top and bottom clamping plates 14 and 15 respectively. The top plate 14 preferably rests upon the master or top leaf of the spring and is centrally apertured as at 16 to receive the head 17 of the spring leaf retaining bolt 18. The plate 14 is further provided with a series of apertures 19 arranged in vertical alignment with a corresponding number of apertures 20 formed in the lateral extensions 21 of the bracket 13. Interposed between the plate 14 and bracket 13 is a pad 22 of non-metallic material such for example as rubber. The central portion of the pad is preferably concaved or depressed as at 23 forming a seat for the axle and the end portions thereof are provided with a series of openings 24 arranged in alignment with the apertures 19 and 20 in the plate 14 and bracket 13 respectively. The dimensions of the openings 19 and 24 being such as to snugly receive the bolts 25, while the diameter of the apertures 20 in the bracket is substantially larger so that considerable clearance is provided between the bolt and side walls of the apertures. The lateral extensions 21 of the bracket 13 are provided with depressed portions 26 for receiving and positioning the non-metallic washers 27 which are also apertured to snugly receive the shank portions of the bolts 25 and which constitute seats for the plates or washers 28. The assembly including the plate 14, pad 22, bracket 13, washers 27 and plates 28 are clamped together by means of the nuts 29 threaded upon the bolts 25 and engageable with the plates 28. Thus from the foregoing, it will be apparent that the axle and bracket 13 carried thereby, are insulated from metallic contact with any part of the axle support or spring including the retaining bolts 25. Moreover owing to the resiliency of the non-metallic pad and washers, the bolts will be normally under tension with the result that parts will not work loose.

In order to secure the foregoing assembly to the spring, a series of bolts 30 are permanently fixed to the bottom of the plate 14 in such a manner that the shank portions thereof lie upon opposite sides of the spring and project through suitable apertures formed in the bottom plate 15. Suitable nuts 31 are threaded upon the lower end of the bolts for clamping the two plates 14 and 15 together.

Thus from the foregoing, it will be apparent that I have provided a relatively simple axle mounting for vehicles, which in addition to insulating the axle and securing means therefor from metallic contact with the spring and thereby prevent the transmission of spring noises to the vehicle body, also functions as a cushioning means for the axle and consequently cooperates with the springs in performing their function.

While in describing and illustrating the present invention, particular stress has been placed on the association of the non-metallic axle mounting with the rear axle of a vehicle, it should be understood that this mounting is equally applicable upon the front axle of the vehicle and the invention therefore contemplates such an arrangement.

What I claim as my invention is:

1. In combination, a vehicle frame, an axle, a member carried by the frame, a non-metallic member mounted upon the member aforesaid and having a portion intermediate the ends thereof constituting a seat for said axle, and means for securing the axle and non-metallic member to the first mentioned member, said means including a bracket having an intermediate portion secured to said axle and having end portions seated upon the end portions of said non-metallic member.

2. In combination, a vehicle frame, a plate carried by said frame, a non-metallic member co-extensive with said plate and seated thereon, an axle seated upon said member, a bracket co-extensive with the non-metallic member having a portion intermediate the ends thereof secured to the axle and having the end portions thereof seated upon said non-metallic member, and means for clamping said bracket, plate and non-metallic member together.

3. In combination, a vehicle frame, a spring mounted upon said frame, a non-metallic member carried by said spring, an axle engageable with said member intermediate the ends thereof, and a member carried by the axle having a portion clamped into engagement with the non-metallic member aforesaid.

4. In combination, a vehicle frame, a spring carried by the frame, a non-metallic member seated upon the spring having a depressed intermediate portion, an axle seated in said depressed portion, a bracket carried by the axle and engageable with the member aforesaid, means for clamping said bracket and non-metallic member to the spring, and means for insulating said clamping means from metallic contact with said bracket and axle.

5. In combination, a vehicle axle, a supporting member for said axle, a bracket carried by the axle, non-metallic means upon said member constituting a seat for the axle and bracket, means for clamping the bracket to the supporting member including clamping elements, and non-metallic means for insulating the clamping elements from contact with the said bracket.

6. In combination, a vehicle axle, a supporting member for said axle, non-metallic means disposed between the axle and support, a bracket secured to the axle having portions engageable with said non-metallic means, non-metallic members positioned upon the portions aforesaid of the bracket, and clamping elements engageable with the non-metallic members for clamping the axle to the supporting member.

7. In combination, a vehicle frame, a spring carried by the frame, a clip for the spring having a top plate, an axle, non-metallic means upon said plate having a portion forming a seat for the axle, a bracket secured to the axle having extensions engageable with the non-metallic means, said extensions having depressed portions in the top surface thereof, non-metallic washers positioned within said depressed portions, and means engageable with the washers for clamping the bracket to the plate aforesaid.

8. In combination, a vehicle frame, a member carried by the frame, a non-metallic member engaging the member aforesaid, a vehicle axle engaging said non-metallic member and a bracket having a portion embracing said axle and having laterally projecting attaching portions engageable with said non-metallic member whereby said axle and bracket are insulated from metallic contact with the first mentioned member.

9. In combination, a vehicle frame, a member carried by the frame, a non-metallic member engaging the member aforesaid, a vehicle axle engaging said non-metallic member, a bracket having a portion embracing said axle and having another portion engageable with said non-metallic member, means for securing said bracket, axle and non-metallic member to said first mentioned member and insulating means for said securing means whereby said axle and bracket are free from metallic contact with said first mentioned member.

10. In combination, a vehicle frame, an axle, a member carried by the frame, a non-metallic member mounted upon the member aforesaid and having a portion engageable with said axle, and means for securing the axle and non-metallic member to the first mentioned member, said means including a bracket having an intermediate portion engageable with said axle and having portions upon opposite sides of said axle clamped to said non-metallic member.

11. In combination, a vehicle axle, a supporting member for said axle, a bracket engageable with said axle, non-metallic means arranged upon said supporting member in engagement with said axle and bracket, means for clamping the bracket to the supporting member including clamping elements extending through the supporting member, non-metallic means and bracket, and insulating means for the clamping elements whereby said axle and bracket are free from metallic contact with the supporting member.

In testimony whereof I affix my signature.

EARLE S. MACPHERSON.